United States Patent [19]
Moretti et al.

[11] Patent Number: 5,289,120
[45] Date of Patent: Feb. 22, 1994

[54] RAILWAY AXLE BEARING AND SEALING ASSEMBLY WITH INTEGRATED ROTATIONAL SPEED DETECTOR

[75] Inventors: Roberto Moretti; Dario Bertorelli, both of Moncalieri; Matteo Genero, Santena, all of Italy

[73] Assignee: SKF Industrie S.P.A., Turin, Italy

[21] Appl. No.: 889,263

[22] Filed: May 28, 1992

[51] Int. Cl.$^5$ .......................... G01P 3/48; G01P 3/54; G01B 7/14
[52] U.S. Cl. .................. 324/174; 324/207.2; 324/207.21; 324/207.25; 310/168
[58] Field of Search .............. 324/174, 207.22, 207.16, 324/207.25; 310/168, 324; 384/446, 448

[56] References Cited

U.S. PATENT DOCUMENTS

| | | |
|---|---|---|
| 4,161,120 | 7/1979 | Cloarec . |
| 4,732,494 | 3/1988 | Guers et al. . |
| 4,946,295 | 8/1990 | Hajzler . |
| 5,017,868 | 5/1991 | Hajlzer ................... 324/174 |
| 5,097,701 | 3/1992 | Nantua et al. . |
| 5,097,702 | 3/1992 | Nantua et al. . |

FOREIGN PATENT DOCUMENTS

| | | |
|---|---|---|
| 0250275 | 12/1987 | European Pat. Off. . |
| 0323789 | 7/1989 | European Pat. Off. . |
| 0327434 | 8/1989 | European Pat. Off. . |
| 0376771 | 7/1990 | European Pat. Off. . |
| 1550178 | 8/1979 | United Kingdom . |
| 2204647 | 11/1988 | United Kingdom . |

*Primary Examiner*—Walter E. Snow
*Attorney, Agent, or Firm*—Burns, Doane, Swecker & Mathis

[57] ABSTRACT

A railway axle is described of the type in which a rolling element bearing is mounted within a seat defined between two members, a first of which rotates with respect to the second, and is provided, externally of the seat, with a sealing assembly adapted to protect respective rolling bodies of the bearing; an annular element of the sealing assembly is fixed for rotation with the rotating member of the axle and is provided with a plurality of permanently magnetized zones having substantially the same width circumferentially spaced from one another with substantially constant pitch; within the seat and close to the said annular element of the sealing assembly there is further provided a sensor carried by the fixed member of the axle and adapted to be activated by the transit past it of the said magnetized zones to generate a periodic signal having a frequency proportional to the number of these which transit past the sensor in unit time.

7 Claims, 2 Drawing Sheets

RAILWAY AXLE BEARING AND SEALING ASSEMBLY WITH INTEGRATED ROTATIONAL SPEED DETECTOR

BACKGROUND OF THE INVENTION

The present invention relates to a railway axle of traditional type, into the structure of which is integrated a detector for sensing the speed of rotation of the wheel (in the case of bogies having independent wheels) or of the wheels (in the case of traditional rigid bridge bogies) fixedly mounted to the axle.

It is known that the problem of preventing the wheels from locking during braking, with consequent loss of adhesion, is today encountered not only on road vehicles, but also on modern high speed trains; therefore, antilock braking systems, the so-called ABS devices, have been developed, which are usable on railway bogies with which engines and wagons are equipped. As is known, such bogies usually comprise a pair of axles, each of which supports a pair of wheels; in rigid bridge bogies the two wheels are carried by a single shaft, one on each end, and the shaft is carried freely rotatably by respective supports connected by means of a suspension system having shock absorbing arms, to the supporting structure of the bogie, in turn connected to the wagon or engine. In independent wheel bogies, on the other hand, each wheel of each axle is supported by its own shaft, mounted so as to project through a respective support; these are carried by suspension arms as in the preceding case.

In both types of bogie the speed of rotation of the wheel is detected by means of a sensor disposed in a fixed position in front of a toothed wheel, known as a "phonic wheel" or "impulse ring", made of magnetic material and fitted to the shaft: by rotating the shaft, a succession of voids and solid parts determined by the presence of the teeth on the phonic wheel pass in succession in front of the coil and cause the creation of a variable electrical signal across its terminals, the frequency of which signal is proportional to the number of teeth which transit in front of the sensor in a unit of time and, therefore, to the speed of rotation of the wheel or wheels fitted to the shaft together with the phonic wheel. The signal generated by the sensor is then processed by an electronic central processing unit which, by comparing it with signals generated by the other wheels of the bogie, is able to detect wheel-lock phenomena during braking and, consequently, to control the braking device in a suitable manner.

The arrangement described is not, however, entirely free from disadvantages. In particular, the sensors and the associated phonic wheels are bulky and difficult to adjust; assembly is therefore onerous in that it is necessary to ensure a perfect centering, between the sensor, usually carried by the closure cover for the shaft bearing housing, and the phonic wheel, carried by this latter, otherwise the system performs poorly; finally, the sensors have a low sensitivity at low speed so that the ABS system of the train does not detect speeds below five to seven Km/h.

SUMMARY OF THE INVENTION

The object of the invention is to provide a railway axle which carries, integrated within its structure, a detector for sensing the speed of rotation of the shaft, or rather of the rotating member to which the wheels are fitted, in such a way as to eliminate the problems of bulk and assembly described above. It is also an object of the invention to provide an axle of the said type in which the integrated speed detector is able to generate an effective signal even at low speed.

The said object is achieved by the invention, which relates to a railway axle carrying, integrated therewith, a detector for sensing the speed of rotation of a rotating member of the axle, which is supported by a member fixed via at least one associated rolling element bearing housed in a seat defined between the rotating member and the fixed member of the axle, the bearing being provided towards the exterior of the seat with a sealing assembly adapted to protect the rolling bodies of the bearing, characterised by the fact that an annular element of the sealing assembly is fixed for rotation with the rotating member of the axle and is provided with a plurality of zones of discontinuity having substantially the same width and disposed circumferentially at substantially constant pitch; within the said seat and close to the said annular element of the sealing assembly there being further provided a sensor carried by the fixed member of the axle and adapted to be activated by the transit past it of the said zones to generate a periodic signal having a frequency proportional to the number of the said zones which transit past the sensor in unit time.

BRIEF DESCRIPTION OF THE DRAWINGS

For a better understanding of the invention there is now given a non-limitative description of an embodiment, with reference to the attached drawings, in which.

DETAILED DESCRIPTION OF THE INVENTION

Figure 1:
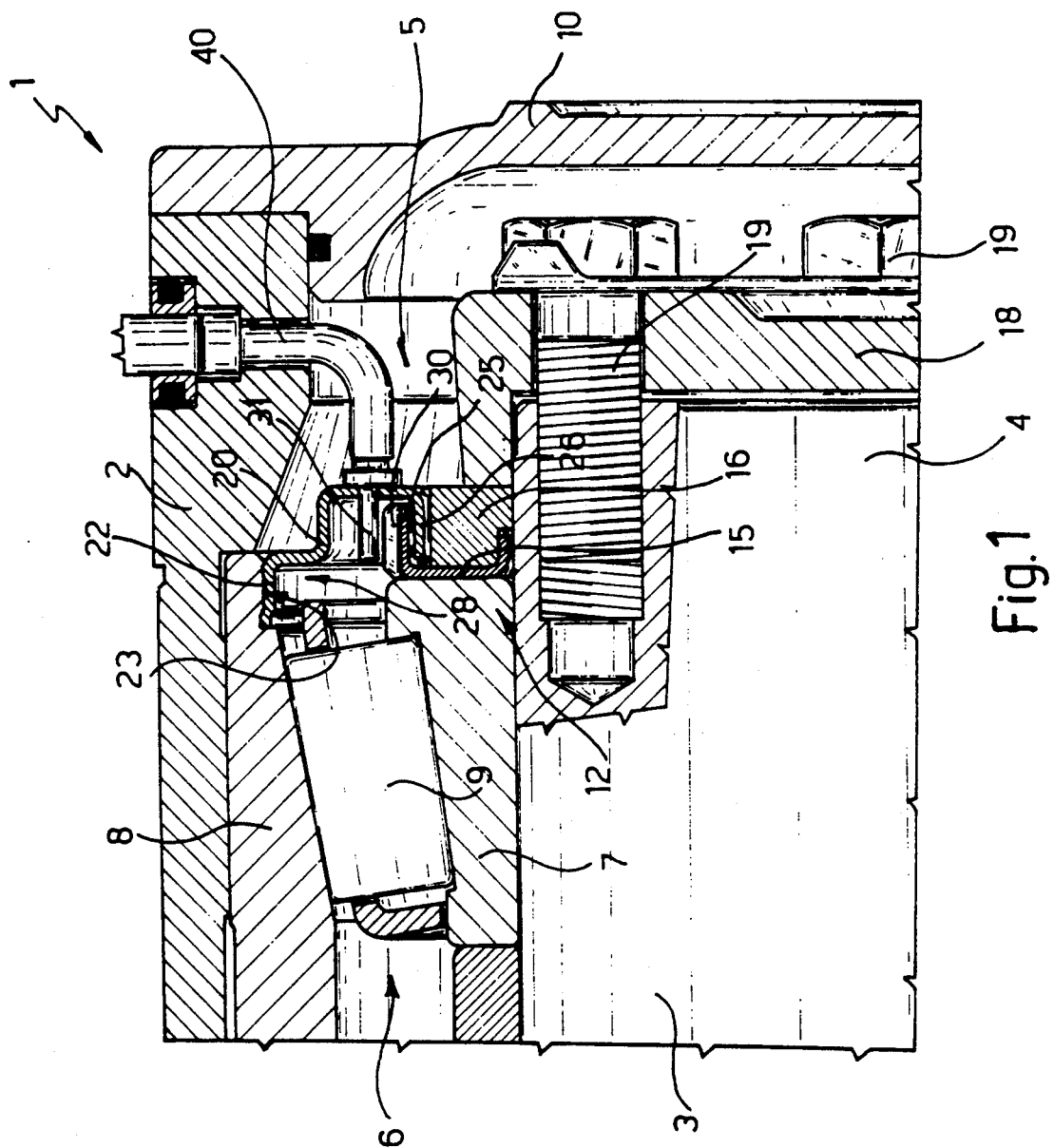
FIG. 1 is a transversely sectioned elevation view of a terminal part of a railway axle formed according to the invention; and Figures from 2 to 4 illustrate different embodiments of a detail of the axle of FIG. 1.

With reference to FIG. 1, the reference numeral 1 generally indicates a railway axle having a substantially known overall structure and of which, therefore, only a terminal portion is illustrated for simplicity. The axle 1 comprises a fixed member, in the specific example a support 2 connected in a known way not illustrated for simplicity to a railway bogie fixable to a wagon or an engine, also known and not illustrated for simplicity, and a rotating member, in the specific example a shaft 3 of which only the portion near to one end 4 thereof is illustrated, which is housed within a seat 5 formed in the support 2; the shaft 3 carries, fitted to it in a known way not illustrated for simplicity, at least one wheel and is carried freely rotatably by the support 2 by means of at least one rolling element bearing 6 comprising an inner ring 7 fitted for rotation with the shaft 3, for example by being an interference fit thereon, an outer ring 8 fitted fixedly to the support 2, mounted in the seat 5, and a plurality of rolling bodies 9 interposed between the rings 7, 8. For example, the shaft 3 can be supported by a pair of opposed conical roller bearings, by a ring of rollers or by a single conical roller bearing having two rings of rollers. The seat 5 is closed by a cover 10 fixed in a known way not illustrated to the support 2, for example by means of screws, and at the end 4, or rather at the end facing towards the cover 10 and the exterior of the seat 5, there is disposed a sealing assembly 12, of the generally known labyrinth type.

In particular, the sealing assembly 12 comprises a first rigid screen 15 fitted, and thereby centered, on a spacer ring 16 mounted centrally on the end 4 and held in contact against the inner ring 7 by an axial locking element fixedly carried by the end 4 and defined by a washer 18 fixed to the end face of the shaft 3 by screws 19, and a second rigid screen 20 fixed securely in a known way, directly to the outer ring 8. The screen 15 is defined by an annular element which is C-shape in radial section, the concavity of which faces towards the spacer ring 16 and which is clamped between this latter and the inner ring 7 of the bearing so as to be axially and angularly fixed to the shaft 3; the screen 20, on the other hand, is defined by an annular element which is U-shape in radial section and provided radially outwardly with an annular projection 22 which is L-shape in section, which is coupled to the ring 8, for example clenched into a seat 23 thereof; in this way the screen 20 is axially and angularly fixed to the ring 8 and disposed with its concavity facing towards the screen 15; this and the screen 20 are moreover partially axially inter-fitted into one another in such a way as to define between them a labyrinth seal adapted to protect the rolling bodies 9 from external contaminants such as water and dust, which can penetrate into the seat 5 and, at the same time, to retain between the rings 7, 8 any lubricating grease in contact with the rolling bodies 9. In the specific example a radially outer annular portion 25 of the screen 15 is inserted with clearance into the concavity of the screen 20 whilst a radially inner annular portion 26 of this latter is fitted with clearance into the concavity of the screen 15, in the annular space lying between the portion 25 and the ring 16, which partially extends into the cavity of the screen 15 and is consequently substantially facing the portion 25. In this way, between the rings 7, 8 and the screens 15, 20 there is created in the seat 5 a substantially sealed chamber 28 towards which the concavity of the screen 20 faces.

Figure 2:
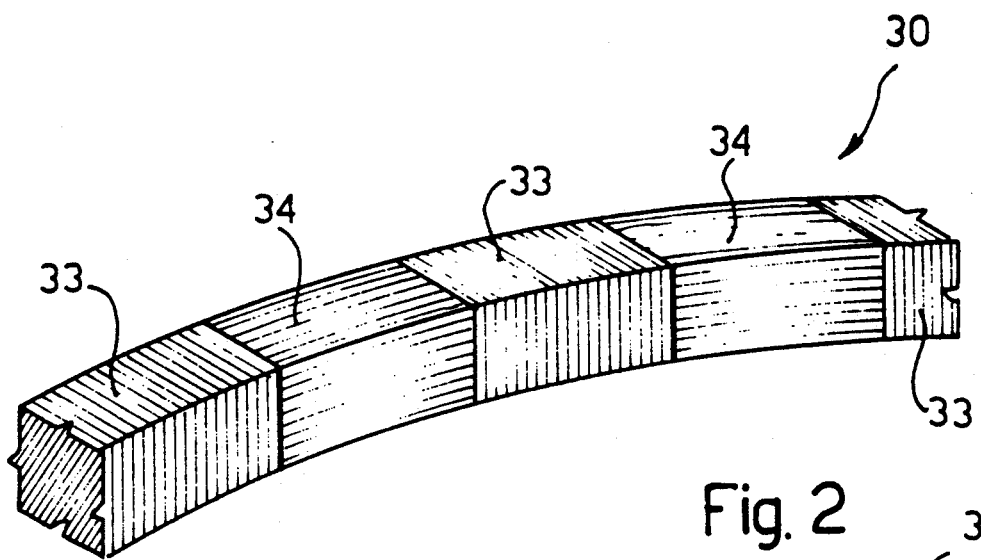
Figure 3:
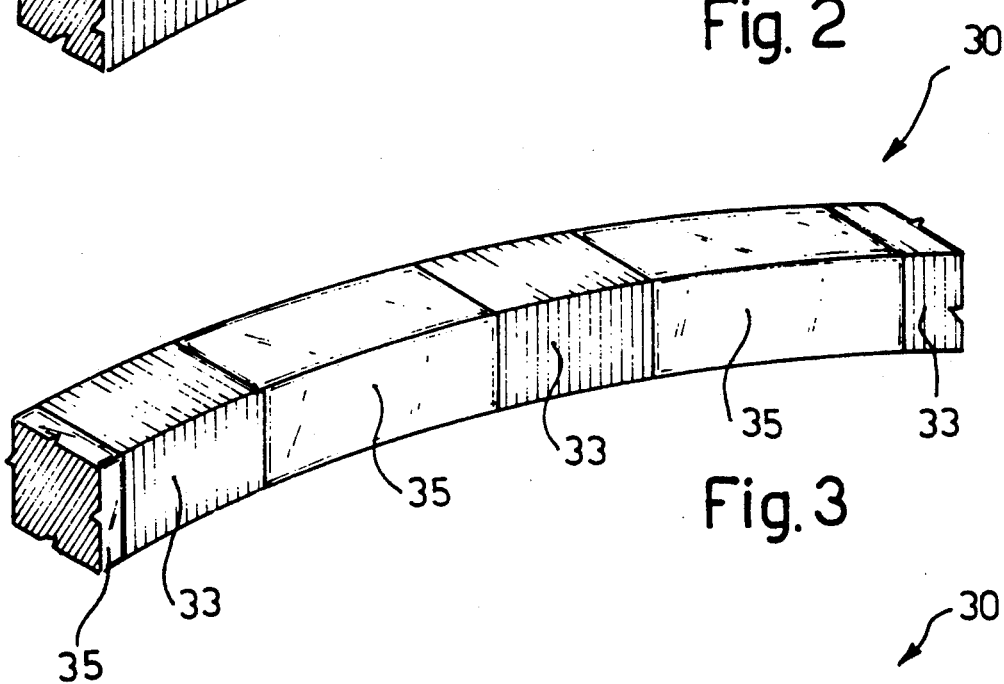
Figure 4:
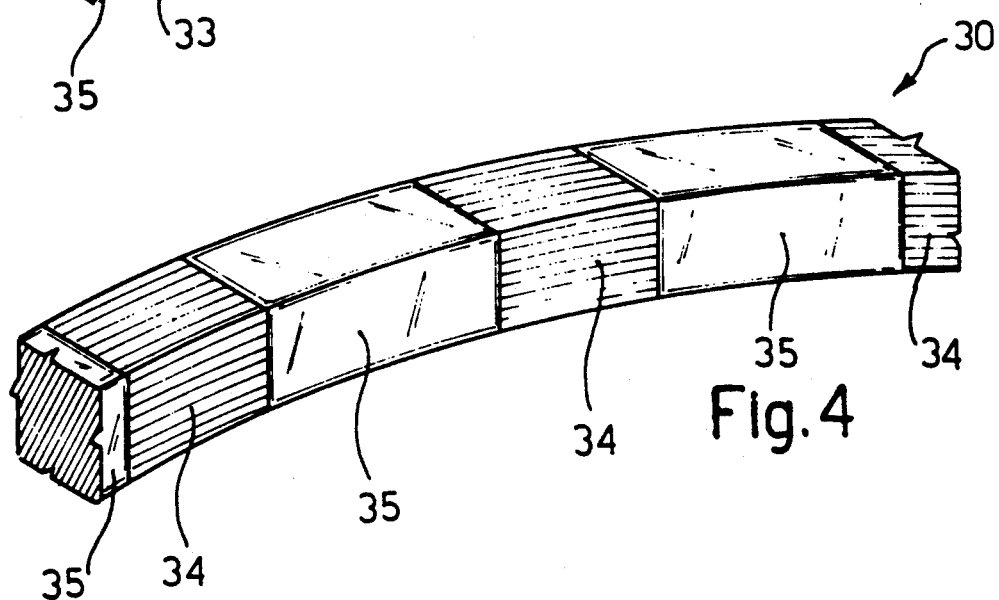

According to the invention, and with reference also to Figures from 2 to 4, the sealing assembly 12 further includes an annular element 30 fixed for rotation with the shaft 4, or rather to the rotating member of the axle 1, and provided with a plurality of zones of discontinuity, in the case in point of permanently magnetized zones having substantially the same width and disposed circumferentially with substantially constant pitch; within the seat 5 and close to this annular element 30 is disposed a known sensor 31 carried fixedly on the fixed member of the axle 1, that is on the support 2, and adapted to be activated by the transit past it of the said magnetized zones to generate a periodic signal having a frequency proportional to the number of such zones which transit past the sensor in unit time. In the specific example shown the annular element 30 is supported by the annular portion 25 of the screen 15, on the side facing towards the portion 22 of the screen 20, whilst the sensor 31 is supported by this latter, housed by the screen 20 within the concavity thereof, in an axial position corresponding to that of the element 30 but displaced radially outwardly therefrom. Finally, both the element 30 and the sensor 31 are housed within the sealed chamber 28 in closely facing relationship, and the element 30 is free to rotate, together with the screen 15, the rings 7, 16 and the shaft 3 with respect to the sensor 31 which, on the other hand, remains stationary with the ring 8 and the support 2. As non-limitatively illustrated in FIG. 2, the element 30 is provided with bipolarly magnetized zones 33, 34 alternately defining the North Pole zones 33 and the South Pole zones 34; in this case a sensor 31 of the known magneto-resistance type or, preferably of the Hall effect type is used on the axle 1. According to two possible variants illustrated in FIGS. 3 and 4, the element 30, rather than being magnetized bipolarly, can be provided only with unipolarly magnetized zones, for example only zones 33 defining all North poles (FIG. 3) or else only zones 34 defining all South poles (FIG. 4); in this case the zones 33 (or 34) are formed in such a way as to be circumferentially spaced from one another and to be thus separated from non magnetized zones 35 so realizing the desired discontinuity; in these variants a sensor 31 of the Hall effect type or, preferably of the magneto-resistance type, all well known in the art, are utilised in the axle 1.

In a preferred embodiment, the element 30 is made in any of the ways illustrated in Figures from 2–4, by utilising a rubber filled with magnetizable material, for example metal or oxide or alloy powders of permanent magnet material which are treated with known forming techniques, for example injection moulding or compression. Alternatively, a plastics material may also be used, filled as above, or else the element 30 may be entirely formed by sintering starting from magnetic powder materials. Once formed into a ring the element 30 can be fixed securely to the portion 25, radially externally of this, for example by adhesive during a vulcanization stage according to known techniques. In a possible variant not illustrated for simplicity the element 30 can however also be made integrally with the screen 15 and in this case may be constituted by the portion 25 itself. In any case, the permanently magnetized zones 33, 34 are still obtained using the same techniques, which are well known and which therefore will not be described here for simplicity; it is sufficient to indicate that these techniques include subjecting the zones to be magnetized to intense localized magnetic fields in such a way as to produce a magnetization by the magnetic hysteresis effect. In all cases the sensor 31 is mounted on the screen 20 and to collect the signal generated by it there is provided a cable 40 which extends from the screen 20 on the outside of the chamber 28 and is housed in the support 2.

In use rotation of the wheels of the train causes rotation of the shaft 3 and, consequently of the screen 15, whilst on the other hand the screen 20 does not rotate, being fixed to the support 2; consequently, the screen 15, which as described is coaxial with the screen 20, rotates with respect to this and within the concavity thereof causing on the one hand an hydraulic sealing action and, on the other hand, the passage of the zones, 33, 34 past the sensor 31. If a Hall effect sensor is employed this is supplied from outside by a suitable known electronic circuit not illustrated for simplicity and behaves as a switch which opens and closes each time a zone 33 and then a zone 34 passes or vice versa. In all conditions, and therefore even at very low speeds of rotation, this generates a pulsing signal of constant amplitude the frequency of which is a function of the speed of rotation of the shaft 3 which can therefore be calculated by a suitable circuit and sent, for example by means of the cable 40, to a central control unit of a known ABS unit not illustrated for simplicity. In the case of the magneto-resistant sensor the final result is the same (generation of a signal with a frequency proportional to the speed of rotation of the screen 15 and an intensity which is always high and well detectable) but changes the necessary electronic control and detection circuits are different, which circuits, in both cases, are well known and can be mounted outside the seat 5, or else miniaturized and mounted directly with the sensor 31 on the screen 20.

From what has been described the advantages associated with the invention will be apparent; the costs and problems of assembly and bulk resulting from the presence of phonic wheels mounted on the end 4 of the shaft 3, and electromagnetic sensors mounted on the cover 10, as in the arrangements known in the art, are completely eliminated. In fact, the detector composed of element 30 and sensor 31 is integrated in a sealed unit 12 of small dimensions which would be needed in any case for reasons of protection of the bearing 6.

Also eliminated are the problems associated with the working costs necessary to ensure the correct positioning of the sensor with respect to the phonic element; in fact, in the invention, these are carried by two screens which must already be positioned correctly in relation to one another for reasons of sealing, and therefore the centering offered by the rings 8 and 16 is exploited. Finally, there is provided a system able to detect the speed of rotation with precision even at low speed. If necessary, the discontinuity zones needed for the operation of the sensor may be defined also by empty zones (vanes) alternated to solid zones (teeth), both magnetized or not, as in the traditional impulse rings.

We claim:

1. A railway axle assembly comprising:
   a fixed support member;
   a rotating member coaxially arranged in the fixed support member;
   a rolling bearing housed in a seat defined between the fixed member and the rotating member to rotatably support the rotating member with respect to the fixed member;
   a sealing assembly provided adjacent to the rolling bearing on an outer side of the seat facing a seat closure cover thereof;
   said sealing assembly comprising a first annular rigid screen connected to said rotating member and a second annular rigid screen connected with said fixed member, said sealing assembly further comprising a spacer ring coaxially mounted on said rotating member and an axial locking element carried fixedly by said rotating member for urging said spacer ring against an inner ring of said rolling bearing fixed to said rotating member;
   said first screen being C-shaped in radial section and mounted with its concavity facing towards said cover in such a manner as to be clamped between the spacer ring and said the ring of the rolling bearing;
   said second screen being defined by a concave annular element fixed to an outer ring of the rolling bearing rigid with said fixed member and having its concavity facing the concavity of the first screen, said screens being partly inter-fitted within one another in such a way as to define therebetween a labyrinth seal and, together with said rings of the rolling bearing, a sealed chamber closed in a fluid-tight manner by said labyrinth seal; and,
   a detector sensitive to the speed of rotation of the rotating member, said detector comprising a sector secured to the fixed member and an annular member rotating relative to the sensor, said annular member encoded with a plurality of zones of discontinuity having substantially the same width and disposed circumferentially at substantially constant pitch, said discontinuity zones being designed to transit past the sensor for activating the sensor to generate a periodic signal having a frequency proportional to the number of said zones which transit past the sensor in a selected unit time wherein said annular encoded member is part of the first annular rigid screen of said sealing assembly, while said sensor is carried in a fixed manner by the second annular rigid screen of said sealing assembly and said annular encoded member and said sensor are housed inside said sealed chamber radially spaced from each other.

2. A railway axle according to claim 1, wherein said annular encoded member is provided with bipolarly magnetized zones defining alternate North and South poles, said sensor being a Hall effect sensor or a magneto-resistance sensor.

3. A railway axle according to claim 1, wherein said annular encoded member is provided with unipolarly magnetised zones defining all North poles or all South poles spaced circumferentially from one another in such a way as to be separated by nonmagnetised zones; said sensor being one of a Hall effect sensor or a sensor of the magneto-resistance type.

4. A railway axle according to claim 1, wherein said rotating member is defined by a shaft and the fixed member is defined by a support for the shaft within which said seat is formed, and wherein said sealing assembly is disposed towards one end of the shaft facing outwardly of the seat, said second screen being provided radially outwardly with an annular projection by means of which the second screen is fixedly secured to an outer ring of the rolling bearing coupled with said support.

5. A railway axle according to claim 4, wherein a radially outer annular portion of the first screen is inserted in the concavity of the second screen and fixedly supports said annular encoded member, and wherein said sensor is housed through said second screen within the concavity thereof, in an axial position corresponding to that of the encoder member but displaced radially outwardly thereof.

6. A railway axle according to claim 4, wherein said annular encoded member is made of a rubber filled with magnetizable material and is fixedly applied to said first screen; said sensor being provided with means for the collection of signals emitted thereby, which extends from the second screen and is housed through said support.

7. A railway axial according to claim 4, wherein said annular encoded member is formed by sintering of magnetic powders and is fixedly secured to said first screen; said sensor being provided with means for collecting the signals emitted thereby, said sensor extending from the second screen and housed by said support.

* * * * *